United States Patent
Lei et al.

(10) Patent No.: US 12,356,444 B2
(45) Date of Patent: Jul. 8, 2025

(54) TECHNIQUES FOR CONFIGURING RANDOM ACCESS OCCASIONS IN WIRELESS COMMUNICATIONS

(71) Applicant: QUALCOMM Incorporated, San Diego, CA (US)

(72) Inventors: Jing Lei, San Diego, CA (US); Linhai He, San Diego, CA (US); Yisheng Xue, San Diego, CA (US); Seyong Park, San Diego, CA (US); Enoch Shiao-Kuang Lu, San Diego, CA (US); Ruiming Zheng, Beijing (CN); Joseph Binamira Soriaga, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/626,093

(22) PCT Filed: Aug. 14, 2020

(86) PCT No.: PCT/CN2020/109101
§ 371 (c)(1),
(2) Date: Jan. 10, 2022

(87) PCT Pub. No.: WO2021/031990
PCT Pub. Date: Feb. 25, 2021

(65) Prior Publication Data
US 2022/0338249 A1 Oct. 20, 2022

(30) Foreign Application Priority Data
Aug. 16, 2019 (WO) ............... PCT/CN2019/101109

(51) Int. Cl.
*H04W 74/00* (2009.01)
*H04W 24/08* (2009.01)
(Continued)

(52) U.S. Cl.
CPC ......... *H04W 74/002* (2013.01); *H04W 24/08* (2013.01); *H04W 74/004* (2013.01); *H04W 74/0833* (2013.01)

(58) Field of Classification Search
CPC ..... H04L 47/10; H04L 43/50; H04L 12/2697; H04L 43/0852; H04L 43/00;
(Continued)

(56) References Cited

U.S. PATENT DOCUMENTS

2018/0110074 A1* 4/2018 Akkarakaran ........ H04W 72/21
2018/0139787 A1   5/2018 Islam et al.
(Continued)

FOREIGN PATENT DOCUMENTS

CN  109076556 A * 12/2018 ........ H04W 74/0833
CN  109964439 A *  7/2019 .......... H04B 7/0617
(Continued)

OTHER PUBLICATIONS

3GPP TSG-RAN2 106, Reno, USA, May 13-May 17, 2019, R2-1905719, Agenda item: 11.13.5, Source: Samsung, Title: 2 step RA: MsgA Aspects. (Year: 2019).*
(Continued)

*Primary Examiner* — Peter G Solinsky
*Assistant Examiner* — Sanjay K Dewan
(74) *Attorney, Agent, or Firm* — ArentFox Schiff LLP

(57) ABSTRACT

Aspects described herein relate to configuring and selecting preamble and payload occasions for performing two-step random access procedures. Configurations on preamble occasions, payload occasions, association pattern between the occasions and synchronization signal block (SSB) beams, and the rules for selecting preamble and payload occasions for random access message transmission can be determined by the network and signaled to user equipment (UE). Based on the configurations and rules, UE can mea-
(Continued)

sure the link level quality and select possible preamble and payload occasions for one or more SSB beams achieving a threshold signal quality. Sets of one or more preamble occasions and one or more payload occasions can be further determined based on whether the preamble and payload occasion(s) can achieve a threshold transmission latency. The one or more preamble occasions and one or more payload occasions can be used to transmit random access messages in the two-step random access procedure.

30 Claims, 10 Drawing Sheets

(51) Int. Cl.
*H04W 74/08* (2024.01)
*H04W 74/0833* (2024.01)

(58) Field of Classification Search
CPC . H04W 74/008; H04W 24/08; H04W 74/004; H04W 74/0833; H04W 74/002
USPC .......................................................... 370/252
See application file for complete search history.

(56) References Cited

U.S. PATENT DOCUMENTS

| | | | | |
|---|---|---|---|---|
| 2019/0182817 | A1* | 6/2019 | Agiwal | H04B 7/0617 |
| 2019/0246425 | A1* | 8/2019 | Zhang | H04W 74/0833 |
| 2019/0387546 | A1* | 12/2019 | Li | H04L 27/26132 |
| 2020/0314913 | A1* | 10/2020 | Rastegardoost | H04W 36/0077 |
| 2020/0351955 | A1* | 11/2020 | Jeon | H04W 80/02 |
| 2021/0051736 | A1* | 2/2021 | Jeon | H04W 76/11 |
| 2021/0058971 | A1* | 2/2021 | MolavianJazi | H04L 5/0044 |
| 2023/0043620 | A1* | 2/2023 | Khoshkholgh Dashtaki | H04W 74/0833 |

FOREIGN PATENT DOCUMENTS

| | | | | |
|---|---|---|---|---|
| CN | 109964444 | A * | 7/2019 | H04L 5/00 |
| EP | 3217701 | A1 | 9/2017 | |
| WO | 2018062925 | A1 | 4/2018 | |
| WO | 2018089265 | | 5/2018 | |
| WO | 2019022577 | A1 | 1/2019 | |
| WO | 2019063819 | A1 | 4/2019 | |
| WO | 2019137401 | A1 | 7/2019 | |
| WO | WO 2021/030804 | A1 * | 2/2021 | H04W 56/00 |

OTHER PUBLICATIONS

3GPP TSG RAN Meeting #82, Sorrento, Italy, Dec. 10-13, 2018, RP-182894, Source: ZTE Corporation, Sanechips, Title: New work item: 2-Step RACH for NR, Agenda item: 9.1.1. (Year: 2018).*
3GPP TSG RAN WG1 Meeting #97, Reno, US, May 13-May 17, 2019, R1-1907262, Agenda item: 7.2.2.2.2, Source: Qualcomm Incorporated, Title: Initial access and mobility procedures for NR unlicensed. (Year: 2019).*
3GPP TSG-RAN WG1 Meeting #96, Feb. 25-Mar. 1, 2019, Athens, Greece, R1-1903321, Agenda item: 7.2.1.2, Source: Qualcomm Incorporated, Title: Procedures for Two-Step RACH. (Year: 2019).*
3GPP TSG RAN Meeting #82, Sorrento, Italy, Dec. 10-13, 2018, RP-182894, Source: ZTE Corporation, Sanechips, Title: New work item: 2-step RACH for NR, Document for: Approval, Agenda Item: 9.1.1. (Year: 2018).*
3GPP TSG RAN WG1 #97, Reno, USA, May 13-17, 2019, R1-1906905, Agenda item: 7.2.1.1, Source: Samsung, Title: Channel Structure for Two-Step RACH. (Year: 2019).*
3GPP TSG RAN WG1 Meeting #97, Reno, USA, May 13-17, 2019, R1-1905989, Source: ZTE, Sanechips, Title: Further discussions on the channel structure of msgA, Agenda item: 7.2.1.1. (Year: 2019).*
3GPP TSG RAN WG1 396bis, Xi,an, China, Apr. 8-12, 2019, R1-1904716, Agenda item: 7.2.1.2, Source: Nokia, Nokia Shanghai Bell, Title: On 2-step RACH Procedure. (Year: 2019).*
3GPP TSG-RAN WG2 Meeting #106, Reno, USA, May 13-May 17, 2019, R2-1905601, Agenda Item: 11.13.5, Source: OPPO, Title: RACH initialization and resource selection for 2-step RACH. (Year: 2019).*
3GPP TSG-RAN WG1 Meeting #97, May 13-May 17, 2019, Reno, USA, R1-1907256, Agenda item: 7.2.1.2, Source: Qualcomm Incorporated, Title: Procedures for Two-Step RACH. (Year: 2019).*
Qualcomm Incorporated Procedures for Two-Step RACH 3GPP TSG-RAN Wg1 Meeting #96 R1-1903321 Mar. 1, 2019, Sections 2-4.
Samsung 2 Step RA: MsgA Aspects 3GPP TSG RAN2 106 R2-1905719 May 17, 2019, the whole document.
ZTE Corporation et al., New work item: 2-Step RACH for NR 3GPP TSG RAN Meeting #82 RP-182894 Dec. 13, 2018, the whole document.
International Search Report issued in corresponding International Application No. PCT/CN2019/101109 dated Nov. 18, 2020.
Written Opinion issued in corresponding International Application No. PCT/CN2019/101109 dated Nov. 18, 2020.
International Search Report and Written Opinion—PCT/CN2020/109101—ISA/EPO—Nov. 18, 2020.
Qualcomm Incorporated: "Initial Access and Mobility Procedures for NR Unlicensed", 3GPP Draft, 3GPP TSG RAN WG1 Meeting #97, R1-1907262 7.2.2.2.2 Initial Access and Mobility Procedures for NR-U, 3rd Generation Partnership Project (3GPP), Mobile Competence Centre, 650, Route Des Lucioles; F-06921 Sophia-Antipol, vol. RAN WG1, No. Reno, US, May 13, 2019-May 17, 2019, May 13, 2019 (May 13, 2019), XP051728702, pp. 1-16.
"3rd Generation Partnership Project, Technical Specification Group Radio Access Network, NR, Medium Access Control (MAC) Protocol Specification (Release 15)", 3GPP Draft, 38321-F60, 3rd Generation Partnership Project (3GPP), Mobile Competence Centre, 650, Route Des Lucioles, F-06921 Sophia-Antipolis Cedex, France, No. 15.6.0, Jun. 29, 2019 (Jun. 29, 2019), XP051754812, 78 pages, Section 1, Section 5.1.
Huawei et al., "Discussion on the MsgA Resource Selection", 3GPP TSG-RAN WG2 # 106, R2-1907725, Discussion on the MsgA Resource Selection, 3rd Generation Partnership Project (3GPP), Mobile Competence Centre, 650, Route Des Lucioles, F-06921 Sophia-Antipolis Cedex, France, vol. RAN WG2, No. Reno, US, May 13, 2019-May 17, 2019, 3 Pages, May 13, 2019, XP051731156, The Whole Document.
Samsung: "Channel Structure for Two-Step RACH", 3GPP TSG RAN WG1 #97, R1-1906905_Channel Structure for Two-step RACH, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, 11 Pages, May 13, 2019, XP051728355, Section 1, Section 2.1.
Supplementary European Search Report—EP20854001—Search Authority—The Hague—Jul. 24, 2023.
VIVO: "Discussion on Channel Structure for 2-Step RACH", 3GPP TSG RAN WG1 #96bis, R1-1904059_Discussion on Channel Structure for 2-STEP RACH, 3rd Generation Partnership Project (3GPP), Mobile Competence Centre, 650, Route Des Lucioles, F-06921, Sophia-Antipolis Cedex, France, vol. Ran WG1, No. Xi 'an, China, Apr. 8, 2019-Apr. 12, 2019, Apr. 7, 2019, XP051691264, 10 pages, XP051699455, Sections 1, 2.1, 2.2, 2.4. 2.7. p. 1-p. 5.
ZTE et al., "Further discussions on the channel structure of MsgA", 3GPP TSG RAN WG1 Meeting #97, R1-1905989 Further Discussions on the Channel Structure of MsgA—Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, 13 Pages, May 13, 2019, XP051727446, Section 1, Section 2.1.1, Section 2.2, Appendix.
CMCC: "Discussion on Time Period for SSB to RO Association", 3GPP TSG RAN WG1 Meeting #92, R1-1804092, Sanya, China, Apr. 16, 2018-Apr. 20, 2018, Apr. 7, 2018, 4 Pages.

(56) References Cited

OTHER PUBLICATIONS

Nokia, et al., "On 2-Step RACH Procedure", 3GPP TSG RAN WG1 #96bis, R1-1904716, Xi'an, China, Apr. 8, 2019-Apr. 12, 2019, Mar. 29, 2019, pp. 1-16.

OPPO: "RACH Initialization and Resource Selection for 2-step RACH", 3GPP TSG-RAN WG2 Meeting #106, R2-1905601, Reno, USA, May 13, 2019-May 17, 2019, May 2, 2019, pp. 1-4.

Qualcomm Incorporated: "Procedures for Two-Step RACH", 3GPP TSG-RAN WG1 Meeting #97, R1-1907256, 3rd Generation Partnership Project, Mobile Competence Centre, 650, Route Des Lucioles, F-06921 Sophia-AntipolisCedex, France, vol. RAN WG1, Reno, USA, May 13, 2019-May 17, 2019, Reno, USA, May 4, 2019, pp. 1-13, XP051728696.

ZTE, et al., "Further Discussions on the Channel Structure of msgA", 3GPP TSG RAN WG1 Meeting #97, R1-1905989, Reno, USA, May 13, 2019-May 17, 2019, May 3, 2019, pp. 1-13.

\* cited by examiner

Example of NR PRACH Time Domain Configuration

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$ PRACH duration |
|---|---|---|---|---|---|---|---|---|
| | | x | y | | | | | |
| 0 | 0 | 16 | 1 | 1 | 0 | - | - | 0 |
| 27 | 0 | 1 | 0 | 0,1,2,3,4,5,6,7,8,9 | 0 | - | - | 0 |
| 53 | 1 | 1 | 0 | 3,8 | 0 | - | - | 0 |
| 87 | A1 | 16 | 0 | 4,9 | 0 | 1 | 6 | 2 |
| 88 | A1 | 16 | 1 | 4 | 0 | 2 | 6 | 2 |
| 106 | A1 | 1 | 0 | 0,1,2,3,4,5,6,7,8,9 | 0 | 2 | 6 | 2 |
| 107 | A1 | 1 | 0 | 1,3,5,7,9 | 0 | 2 | 6 | 2 |
| 108 | A1/B1 | 2 | 0 | 4,9 | 0 | 1 | 7 | 2 |

| Preamble Format | L | SCS (kHz) | BW (MHz) | CP (ms) | GT (ms) | Total Length (ms) |
|---|---|---|---|---|---|---|
| 0 | 839 | 1.25 | 1.08 | 0.103 | 0.097 | 1 |
| 1 | 839 | 1.25 | 1.08 | 0.684 | 0.716 | 3 |
| 2 | 839 | 1.25 | 1.08 | 0.153 | 0.147 | 3.5 |
| 3 | 839 | 5 | 4.32 | 0.103 | 0.097 | 1 |

| Preamble Format | L | SCS (kHz) | BW (MHz) | CP (us) | GT (us) | Total Length (us) | # OFDM symbols |
|---|---|---|---|---|---|---|---|
| A | 139 | 15×2ᵘ | 2.16×2ᵘ | 9.37×2ᵘ | 0 | 142.71×2ᵘ | 2 |
| | 139 | 15×2ᵘ | 2.16×2ᵘ | 18.75×2ᵘ | 0 | 285.42×2ᵘ | 4 |
| | 139 | 15×2ᵘ | 2.16×2ᵘ | 28.13×2ᵘ | 0 | 428.15×2ᵘ | 6 |
| B | 139 | 15×2ᵘ | 2.16×2ᵘ | 7.03×2ᵘ | 2.34×2ᵘ | 142.71×2ᵘ | 2 |
| | 139 | 15×2ᵘ | 2.16×2ᵘ | 11.22×2ᵘ | 7.03×2ᵘ | 285.42×2ᵘ | 4 |
| | 139 | 15×2ᵘ | 2.16×2ᵘ | 16.41×2ᵘ | 11.72×2ᵘ | 428.15×2ᵘ | 6 |
| | 139 | 15×2ᵘ | 2.16×2ᵘ | 30.47×2ᵘ | 25.78×2ᵘ | 856.29×2ᵘ | 12 |
| C | 139 | 15×2ᵘ | 2.16×2ᵘ | 40.36×2ᵘ | 35.68×2ᵘ | 142.71×2ᵘ | 2 |
| | 139 | 15×2ᵘ | 2.16×2ᵘ | 66.67×2ᵘ | 64.92×2ᵘ | 428.28×2ᵘ | 6 |

FIG. 6

TECHNIQUES FOR CONFIGURING RANDOM ACCESS OCCASIONS IN WIRELESS COMMUNICATIONS

This application is a 35 U.S.C. § 371 National Phase of International Application No. PCT/CN2020/109101, entitled "TECHNIQUES FOR CONFIGURING RANDOM ACCESS OCCASIONS IN WIRELESS COMMUNICATIONS," filed Aug. 14, 2020, which claims priority to International Application No. PCT/CN2019/101109, entitled "TECHNIQUES FOR CONFIGURING RANDOM ACCESS OCCASIONS IN WIRELESS COMMUNICATIONS," filed Aug. 16, 2019, which are assigned to the assignee hereof, and incorporated by reference herein for all purposes.

BACKGROUND

Aspects of the present disclosure relate generally to wireless communication systems, and more particularly, to performing random access procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can use a random access procedure to establish a connection with a base station. A random access procedure can typically include four steps of messages communicated between the UE and base station to establish the connection. Recent proposals have introduced a two-step random access procedure where the UE transmits a first message including a random access preamble and a payload in a shared random access occasion, and the base station receiving the first message can transmit a second message including a random access response (e.g., to the random access preamble) and/or contention resolution information. The first message can include two separate transmissions (e.g., in time) of the preamble and payload portions of the message.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes receiving, from a base station, one or more configurations indicating multiple preamble occasions and multiple payload occasions associated with each of one or more synchronization signal block (SSB) beams, determining, for at least one SSB beam (e.g., of the one or more SSB beams), at least one preamble occasion of the multiple preamble occasions and at least one payload occasion of the multiple payload occasions associated with the at least one SSB beam, transmitting, on the at least one preamble occasion, a random access preamble, and transmitting, on the at least one payload occasion, a payload corresponding to the random access preamble.

In another example, a method for wireless communication includes configuring a preamble configuration period for a preamble of a random access message, configuring a payload configuration period for a payload of the random access message, determining a random access occasion configuration period based at least in part on the preamble configuration period and the payload configuration period, determining, based at least in part on the random access occasion configuration period, an association period for associating one or more random access occasions for transmitting the random access message based on one or more SSB beams, and transmitting, to a user equipment (UE), a configuration indicating resources of the one or more random access occasions related to the one or more SSB beams within the association period.

In a further example, an apparatus for wireless communication is provided that includes a transceiver, a memory configured to store instructions, and one or more processors coupled (e.g., communicatively, electronically, operatively, or otherwise) with the transceiver and the memory. The memory stores instructions executable by the one or more processors to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 illustrates an example of physical random access channel (PRACH) time domain configuration parameters, in accordance with various aspects of the present disclosure;

DETAILED DESCRIPTION

Figure 1:
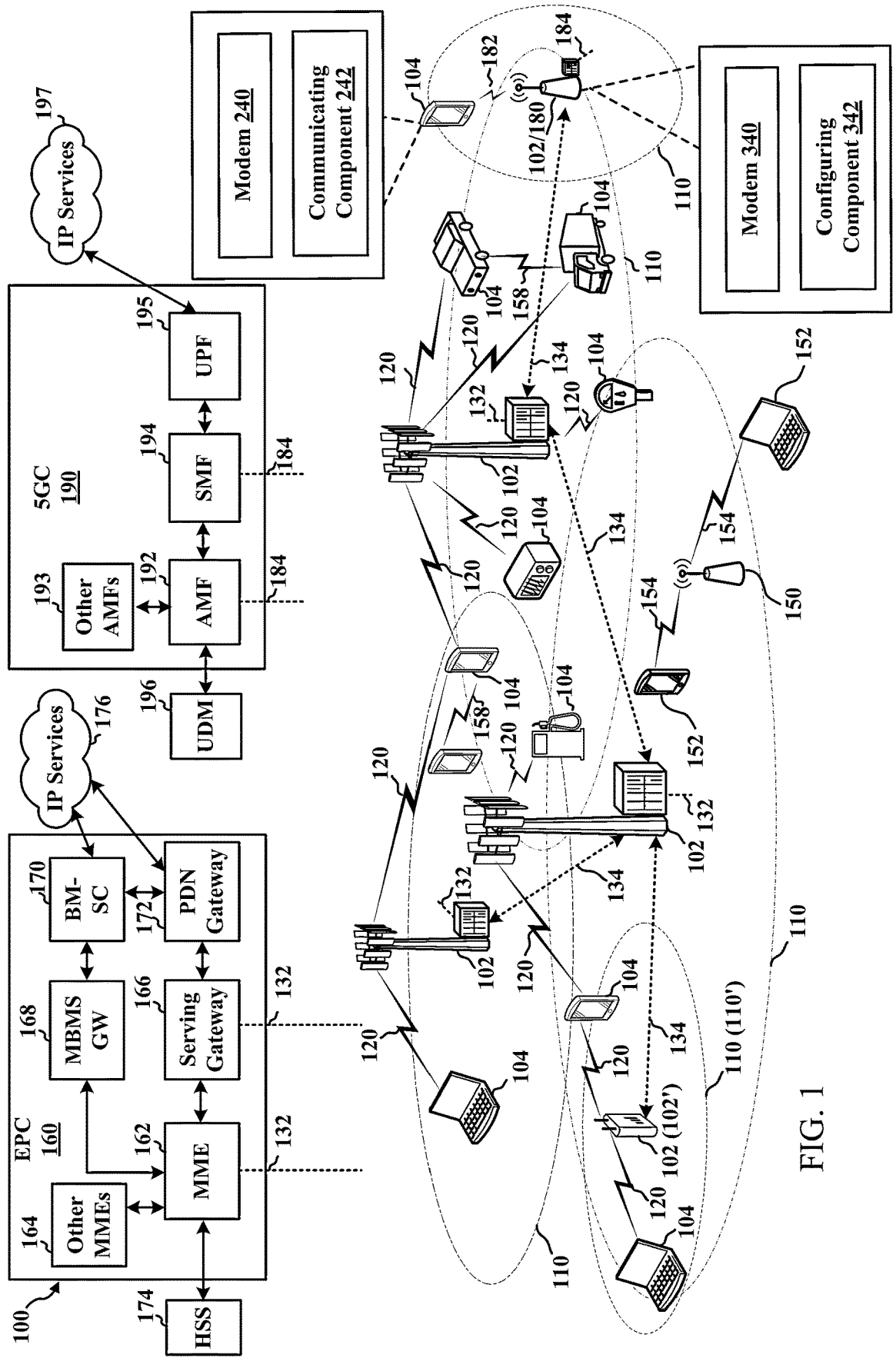
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring random access occasions for transmitting random access messages, where the random access messages may include a random access preamble and a payload for transmitting in a two-step random access procedure. In this regard, a random access occasion can include a preamble occasion for transmitting the random access preamble and a payload occasion for transmitting the payload as a first message in the two-step random access procedure. The network can configure occasion information for user equipment (UEs), and a UE can select a preamble occasion and a preamble sequence for transmitting to the network along with one or more of demodulation reference signal (DMRS) resources and payload occasions for transmitting the payload to the network. In one example, a design for a four-step random access channel (RACH) procedure (e.g., as defined in fifth generation (5G) new radio (NR) Release 15) can be used for the two-step RACH procedure, such that the two-step RACH procedure may share the same (or at least a portion of) preamble occasions in time and/or frequency as the four-step RACH procedure (e.g., as defined or configured for the four-step RACH procedure). In another example, the two-step RACH procedure may be configured with separate preamble occasions than the four-step RACH procedure.

Within a physical RACH (PRACH) slot, the number of time domain preamble occasions and the starting symbol of preamble transmission can be different. Time domain configurations for PRACH preambles can be similar to those specified in third generation partnership project (3GPP) technical specification (TS) 38.211, Section 6.3.3.2. Not all preamble occasions for the four-step RACH (e.g., as defined for NR Release 15) may be suitable for two-step RACH random access message transmission due to the specifications on link level quality and transmission latency.

Accordingly, for example, configuration rules for random access messages in a two-step RACH can be considered or indicated to achieve low transmission latency and desirable link level quality. For example, the preamble and payload occasions of a random access message can be distributed in time, so that each transmission can be associated with an appropriate set of synchronization signal block (SSB) beam(s) (also referred to herein as SSBs) with a desirable (e.g., threshold) link level quality. In addition, to reduce the transmission latency, proximity-based multiplexing in time can be supported for the preamble and payload occasions. For example, the network can configure association periods for associating preamble occasions and/or payload occasions with certain SSB beams. In addition, the UE can determine whether a link quality of an SSB beam achieves a threshold and can determine one or more preamble occasions and/or payload occasions associated with the SSB beam that achieve a threshold transmission latency for transmitting a preamble and payload for the random access message.

The described features will be presented in more detail below with reference to FIGS. 1-10.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining random access occasions for transmitting random access messages in a random access procedure. In addition, some nodes may have a modem 340 and configuring component 342 for configuring or otherwise enabling usage of resources for transmitting random access messages, transmitting response messages to the random access messages, etc., as described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat MD UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, configuring component 342 can configure random access occasions for transmitting random access messages. For example, configuring component 342 can configure preamble occasions and/or payload occasions, which may also include one or more thresholds for determining whether the preamble occasions and/or payload occasions are desirable for transmitting random access messages. In an example, communicating component 242 can receive one or more configurations from the base station 102, and can determine one or more preamble occasions or payload occasions that correspond to SSB beams, which may include determining occasions corresponding to one or more SSB beams having a desirable (e.g., threshold) signal quality. Communicating component 242 may also determine one or more pairs of preamble occasions and payload occasions, having the desirable signal quality, and/or that are within a time interval to achieve a threshold transmission latency. Communicating component 242 may select one or more of the pairs for transmitting a preamble and/or one or more payloads in a random access message of a two-step random access procedure.

Figure 2:
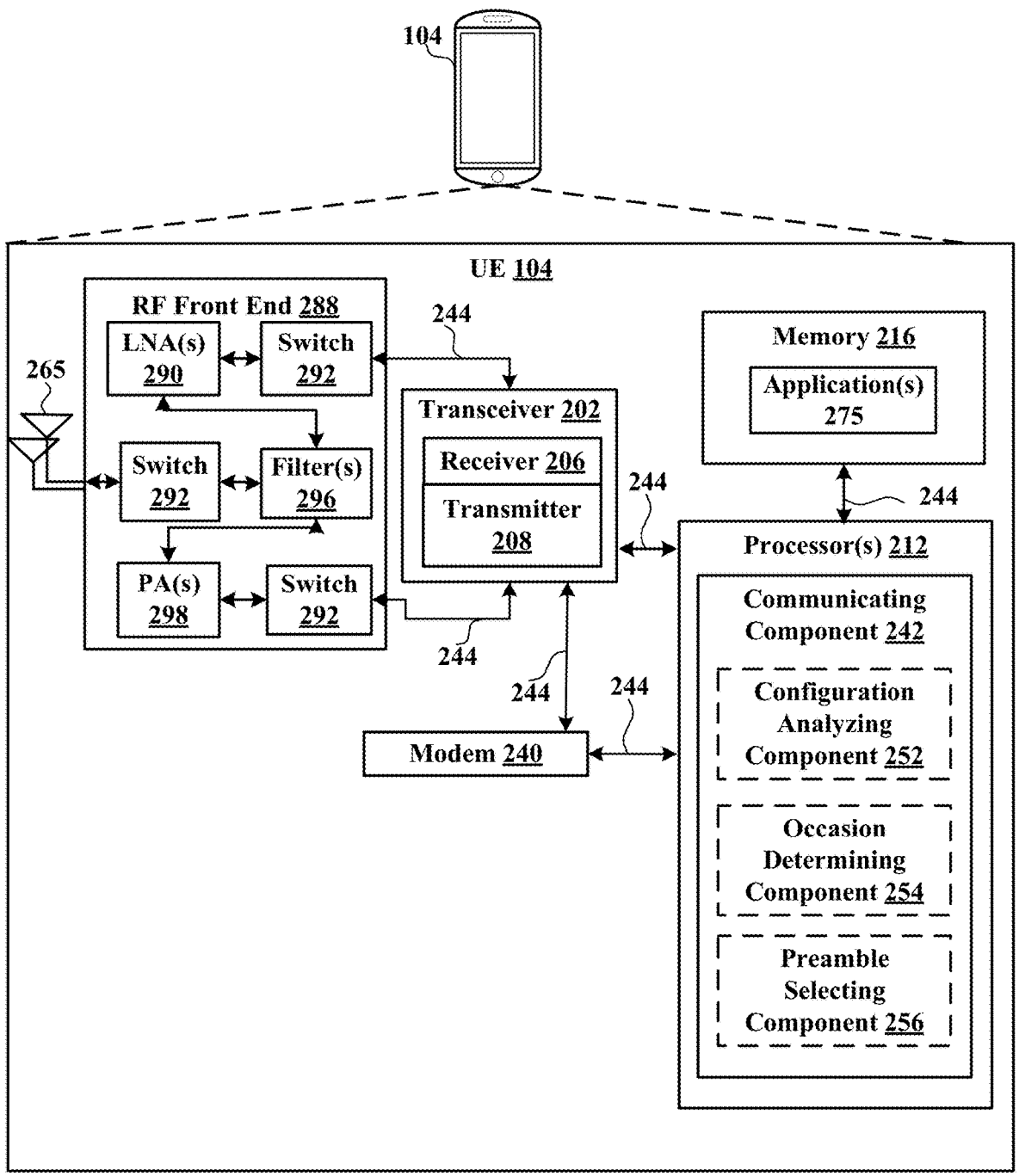
FIG. 2 is a block diagram illustrating an example of a UE, in accordance with various aspects of the present disclosure.
Figure 3:
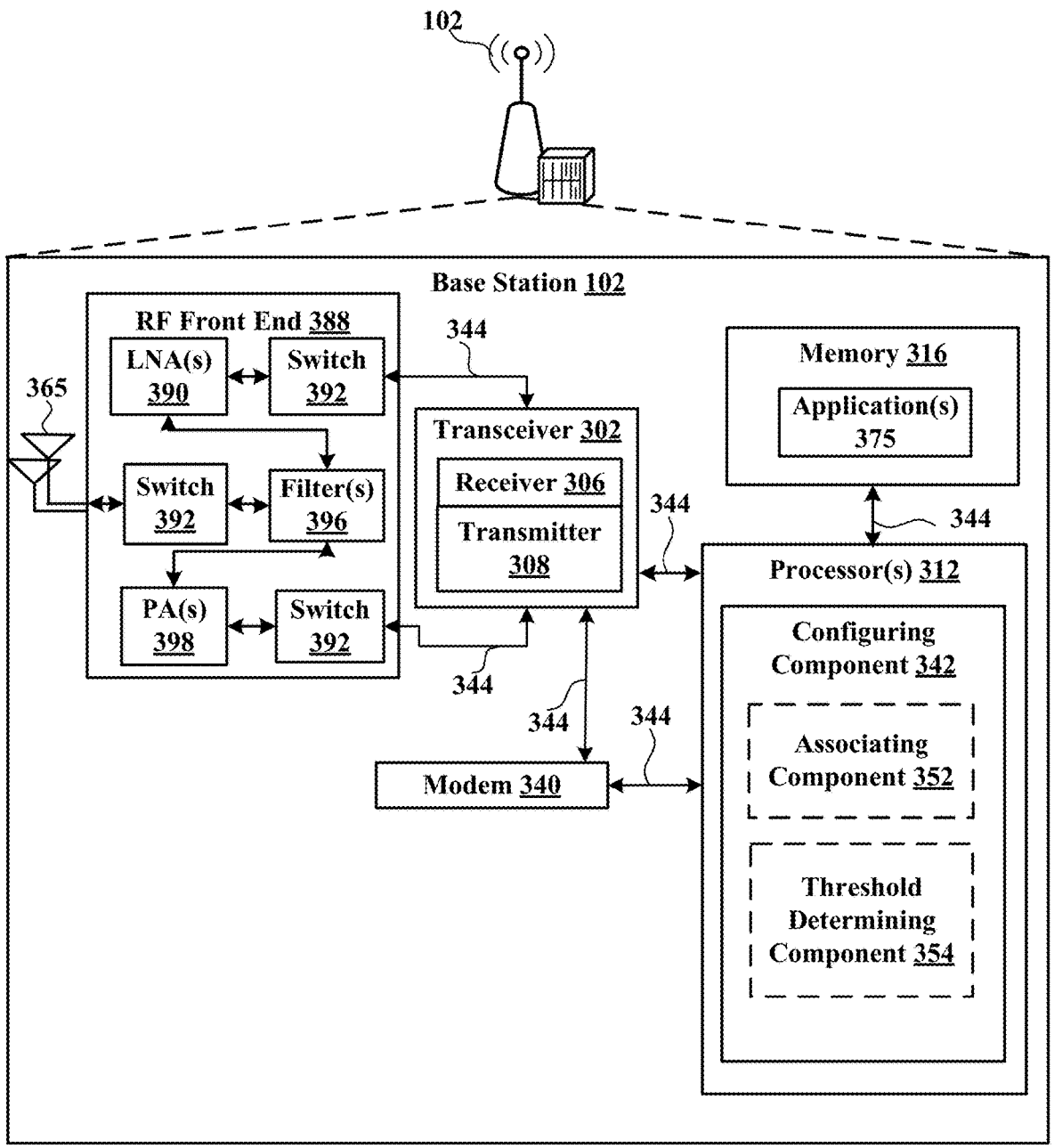
FIG. 3 is a block diagram illustrating an example of a base station, in accordance with various aspects of the present disclosure.
Figure 4:
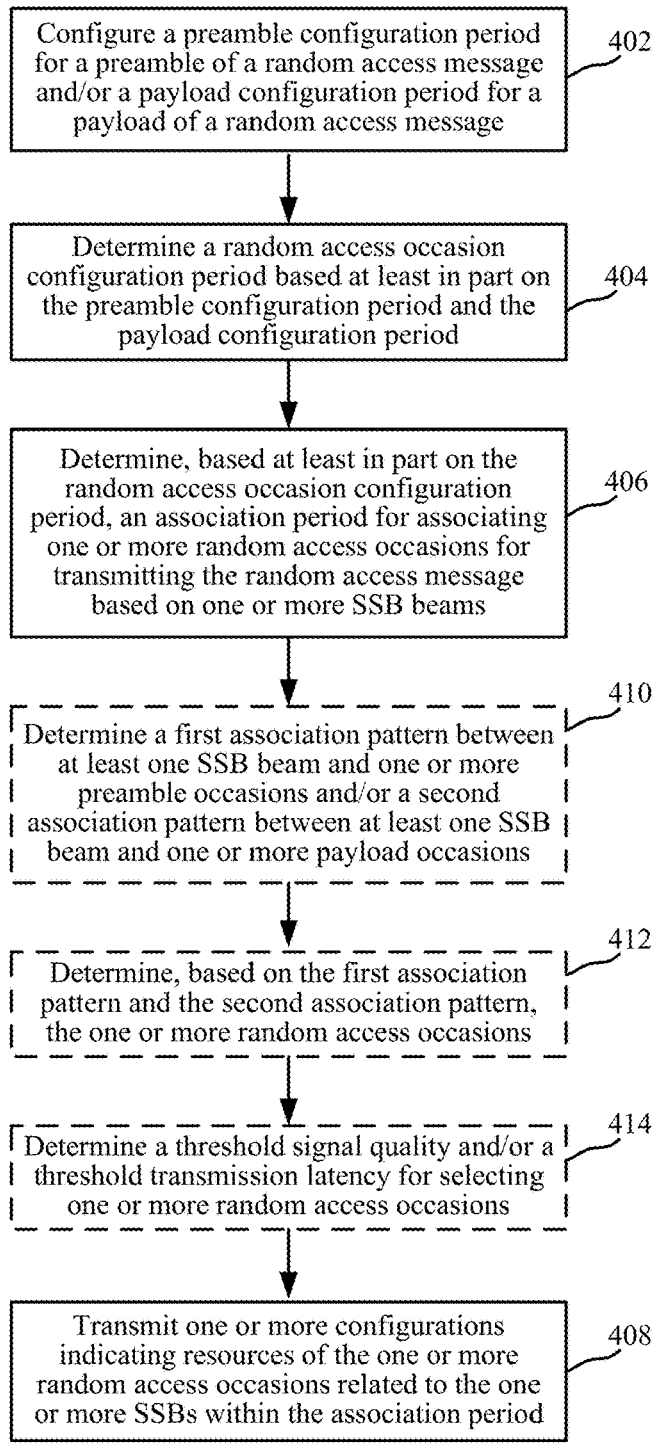
FIG. 4 is a flow chart illustrating an example of a method for configuring preamble and/or payload occasions, in accordance with various aspects of the present disclosure.
Figure 5:
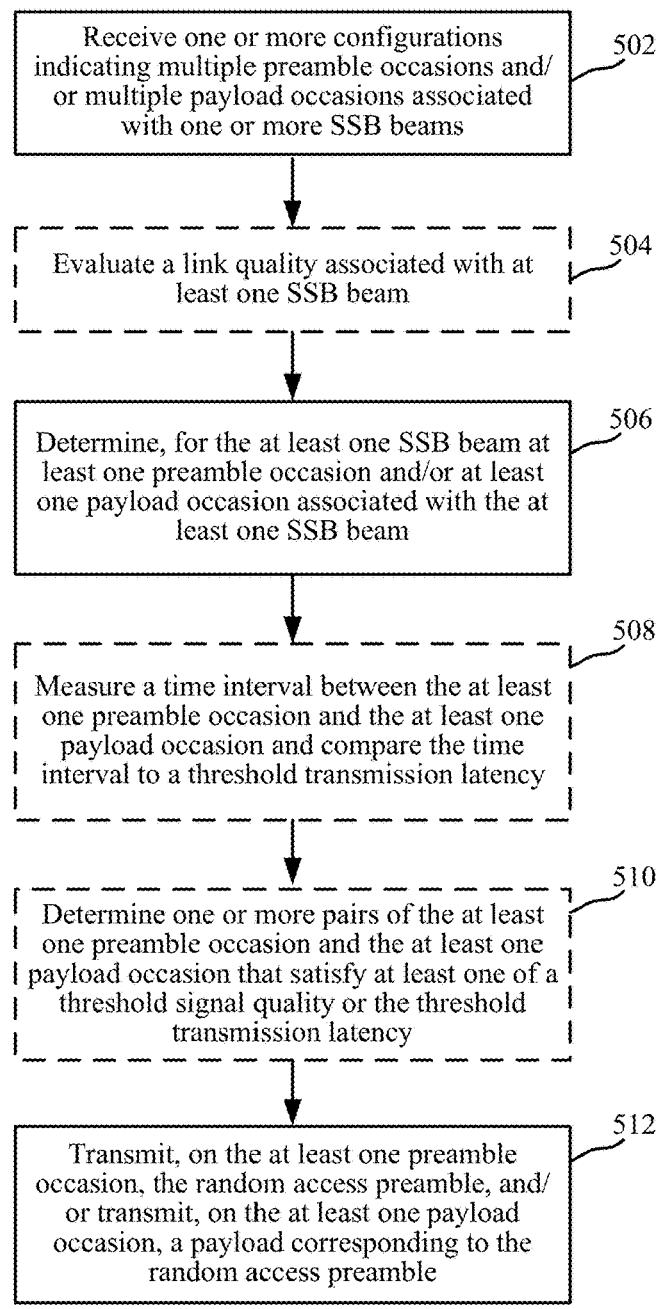
FIG. 5 is a flow chart illustrating an example of a method for determining preamble and/or payload occasions for transmitting random access messages, in accordance with various aspects of the present disclosure.

Turning now to FIGS. 2-10, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting random access messages.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a configuration analyzing component 252 for obtaining and/or analyzing one or more configurations to determine one or more random access occasions associated with one or more SSB beams, an occasion determining component 254 for selecting one or more random access occasions (e.g., a preamble occasion and/or one or more payload occasions) based on comparing parameters to one or more thresholds, and/or a preamble selecting component 256 for selecting a preamble to transmit over the one or more random access occasions.

In an aspect, the processor(s) 212 may correspond to one or more of the processors described in connection with the UE in FIG. 10. Similarly, the memory 216 may correspond to the memory described in connection with the UE in FIG. 10.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for scheduling or otherwise enabling usage of resources for transmitting random access messages, transmitting response messages to the random access messages, etc.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include an associating component 352 for associating random access occasions with one or more SSB beams and/or a threshold determining component for determining or otherwise defining one or more threshold parameter values to facilitate determining whether to use the one or more random access occasions for transmitting random access messages.

In an aspect, the processor(s) 312 may correspond to one or more of the processors described in connection with the base station in FIG. 10. Similarly, the memory 316 may correspond to the memory described in connection with the base station in FIG. 10.

FIG. 4 illustrates a flow chart of an example of a method 400 for configuring a random access occasion. In an example, a base station 102 can perform the functions described in method 400 using one or more of the components described in FIGS. 1 and 3.

In method 400, at Block 402, a preamble configuration period for a preamble of a random access message and/or a payload configuration period for a payload of a random access message can be configured. In an aspect, configuring component 342, e.g., in conjunction with processor(s) 312, memory 316, transceiver 302, etc., can configure the preamble configuration period for the preamble of the random access message and/or the payload configuration period for the payload of the random access message. For example, configuring component 342 can configure the preamble configuration period based on preamble configuration periods specified for a four-step RACH procedure or other RACH procedures in the wireless network (e.g., using preamble configuration periods for RACH procedures defined in NR Release 15). For example, the preamble configuration period may correspond to configuration periods defined in the parameters in FIG. 6.

FIG. 6 depicts examples of NR PRACH Time Domain Configuration parameters that are possible for defining PRACH preamble formats, occasions for transmitting the PRACH preambles, etc. In one example, configuring component 342 may determine some of the parameters for the preamble configuration period based on the parameters of the NR Release 15 PRACH configuration period, and/or may indicate the determined parameters to the UE 104. In yet another example, the preamble configuration period may be configured differently than the NR Release 15 PRACH configuration period.

In addition, configuring component 342 can configure the payload configuration period based on the preamble configuration period, where the payload configuration period may occur within a specified transmission gap from the preamble configuration period (or from possible preamble occasions therein). In addition, configuring component 342 can configure the payload configuration period based on a determined length of payload transmissions. In additional examples, configuring component 342 can configure the payload configuration period based on a duplexing mode configured for communicating with UEs (e.g., whether the mode is frequency division duplexing (FDD) or time division duplexing (TDD)), a slot format configured for communicating with the UEs (e.g., at least where the duplexing mode is TDD), the density of preamble occasions, the resource allocation defined for two-step RACH and/or four-step RACH procedure, etc.

In method 400, at Block 404, a random access occasion configuration period can be determined based at least in part on the preamble configuration period and the payload configuration period. In an aspect, associating component 352, e.g., in conjunction with processor(s) 312, memory 316, transceiver 302, configuring component 342, etc., can determine the random access occasion configuration period based at least in part on the preamble configuration period and the payload configuration period. For example, associating component 352 can determine the random access occasion configuration period as a least common multiple of the preamble configuration period and the payload configuration period.

In method 400, at Block 406, an association period for associating one or more random access occasions for transmitting the random access message based on one or more SSB beams can be determined based at least in part on the random access occasion configuration period. In an aspect, associating component 352, e.g., in conjunction with processor(s) 312, memory 316, transceiver 302, configuring component 342, etc., can determine, based at least in part on the random access occasion configuration period, the association period for associating the one or more random access occasions for transmitting the random access message based on one or more SSB beams. For example, an association period, $T_{ssb-msgA}$, for mapping SSB beams (e.g., SS/physical broadcast channel (PBCH) blocks) to preamble and payload occasions of a two-step random access procedure can be defined as the minimum time interval such that $N_{rx}^{ssb}$ SSB beams are mapped at least once to the preamble and payload occasions within $T_{ssb-msgA}$. For example, $T_{ssb-msgA}$ can include multiple configuration periods of random access occasions (e.g., sets of a preamble occasion and one or more payload occasion(s)). In one example, the association pattern between SSB beam and random access occasion may not change within an association period of $T_{ssb-msgA}$. In addition, for example, preamble or payload occasions not associated with any SSB beams after an integer number of association periods, if any, may not be used for two-step random access transmissions. In one specific example, associating component 352 can determine the association period (e.g., which may include determining a number of random access occasion configuration periods within the association period) based on the below table:

| Random access occasion configuration period (msec) | Association period (number of random access occasion configuration periods) |
| --- | --- |
| 10 | {1, 2, 4, 8, 16} |
| 20 | {1, 2, 4, 8} |
| 40 | {1, 2, 4} |
| 80 | {1, 2} |
| 160 | {1} |

In method 400, at Block 408, one or more configurations indicating resources of the one or more random access occasions related to the one or more SSB beams within the association period can be transmitted. In an aspect, configuring component 342, e.g., in conjunction with processor(s) 312, memory 316, transceiver 302, etc., can transmit (e.g., to a UE 104) the one or more configurations indicating resources of the one or more random access occasions related to the one or more SSB beams within the association period. In an example, configuring component 342 can transmit the one or more configurations using system information (SI), radio resource control (RRC), or other signaling. As such, in one example, the one or more configurations can be broadcast to multiple UEs. For example, as described further herein, associating component 352 can determine which preamble occasions and/or payload occasions can be associated with which SSB beams based on determining that the preamble occasions and/or payload occasions fall within the association period for a given SSB beam. Configuring component 342 can transmit this configuration information to the UE 104 (e.g., as one or more association patterns, as described herein) to facilitate the UE 104 determining which preamble occasions and/or payload occasions correspond to a desirable SSB beam. In one example, the configuration may include an explicit indication of preamble occasions and/or payload occasions to SSB beam, parameters used to associate the preamble occasions and/or payload occasions with an SSB beam, and/or the like, as described further herein.

For example, in method 400, optionally at Block 410, a first association pattern between at least one SSB beam and one or more preamble occasions and/or a second association pattern between at least one SSB beam and one or more payload occasions can be determined. In an aspect, associating component 352, e.g., in conjunction with processor(s) 312, memory 316, transceiver 302, configuring component 342, etc., can determine the first association pattern between at least one SSB beam and one or more preamble occasions and/or the second association pattern between at least one SSB beam and one or more payload occasions. For example, associating component 352 can determine the first association pattern based on determining the one or more preamble occasions that can be associated with a given one or more SSB beams during the association period. This can be based on the parameters defining the preamble occasions (e.g., the timing of the preamble occasions, including a subframe number or slot number or symbol number, which can be an index of a subframe, slot, or symbol for the preamble occasion, starting symbol index, within a slot or subframe, etc.) and based on a determined time for transmitting the SSB beam based on the SSB beam periodicity and a defined SSB beam pattern. Similarly, for example, associating component 352 can determine the second association pattern based on determining the one or more payload occasions that can be associated with a given one or more SSB beams during the association period. In an example, in transmitting the configuration at Block 408, configuring component 342 may include an indication of the first association pattern and/or the second association pattern to allow the UE 104 to determine preamble occasion(s) and/or payload occasion(s) associated with certain SSB beams. For example, this indication may include a mapping of PRACH configuration indices (e.g., as defined in NR Release 15) to SSB or SSB beam indicator or index (or multiple SSB indicators or indices). In another example, this indication can include an indication of a SSB or SSB beam indicator or index (or multiple SSB or SSB beam indicators or indices) corresponding to a given PRACH configuration index, etc.

In addition, in an example in method 400, optionally at Block 412, the one or more random access occasions can be determined based on the first association pattern and the second association pattern. In an aspect, associating component 352, e.g., in conjunction with processor(s) 312, memory 316, transceiver 302, configuring component 342, etc., can determine, based on the first association pattern and the second association pattern, the one or more random access occasions. For example, associating component 352 can determine the one or more random access occasions to include, for each random access occasion, a preamble occasion and one or more payload occasions, that can be associated with one or more SSB beams based on being within (or at least partially within) the association period. In some examples, there may be preamble occasions and/or payload occasions that are not associated with an SSB beam during an association period; in one example, configuring component 342 may configure these for other RACH procedures (e.g., NR Release 15 RACH). In an example, in transmitting the configuration at Block 408, configuring component 342 may include an indication of the one or more random access occasions and associated mapping to SSB or SSB beam indicator(s) (or an indication of one or more SSB or SSB beam indicators associated with each random access occasion) to allow the UE 104 to determine preamble occasion(s) and/or payload occasion(s) in the one or more random access preambles associated with certain SSB beams.

In addition, in an example in method 400, optionally at Block 414, a threshold signal quality and/or a threshold transmission latency for selecting one or more random access occasions can be determined. In an aspect, threshold determining component 354, e.g., in conjunction with processor(s) 312, memory 316, transceiver 302, configuring component 342, etc., can determine the threshold signal quality and/or the threshold transmission latency for selecting the one or more random access occasions. For example, the threshold signal quality may correspond to a signal quality constraint associated with achieving a reliability metric for the two-step random access procedure. Similarly, the threshold transmission latency may correspond to a latency constraint associated with achieving a latency and signaling overhead metric for the two-step random access procedure. In an example, in transmitting the configuration at Block 408, configuring component 342 may include an indication of the threshold signal quality to allow the UE 104 to determine desirable SSB beams and/or the threshold transmission latency to allow the UE 104 to determine which payload occasions can be used with which preamble occasions, corresponding to the desirable SSB beams, to achieve the threshold transmission latency.

FIG. 5 illustrates a flow chart of an example of a method 500 for determining which configured random access occasion to use in transmitting a random access message in a two-step random access procedure. In one example, a UE 104 can perform the functions described in method 500 using one or more of the components described in FIGS. 1 and 2.

In method 500, at Block 502, one or more configurations indicating multiple preamble occasions and/or multiple payload occasions associated with one or more SSB beams can be received. In an aspect, configuration analyzing component 252, e.g., in conjunction with processor(s) 212, memory 216, transceiver 202, communicating component 242, etc., can receive the one or more configurations indicating the multiple preamble occasions and/or the multiple payload occasions associated with one or more SSB beams (e.g., mapped to the one or more SSB beams, as described in reference to Block 406 above). For example, configuration analyzing component 252 can receive the one or more configurations in SI and/or RRC signaling from a base station 102. In one example, configuration analyzing component 252 may receive a configuration including PRACH configuration indices from the network (e.g., from base station 102), from which preamble occasions for transmitting at least a random access preamble portion of a random access message can be determined. As described, in an example, the PRACH configuration indices may correspond to those described in FIG. 6, and other timing parameters for the preamble occasions can be determined based on the preamble format of the PRACH configuration indices. Additional examples are shown in FIGS. 7-8.

Figure 7:
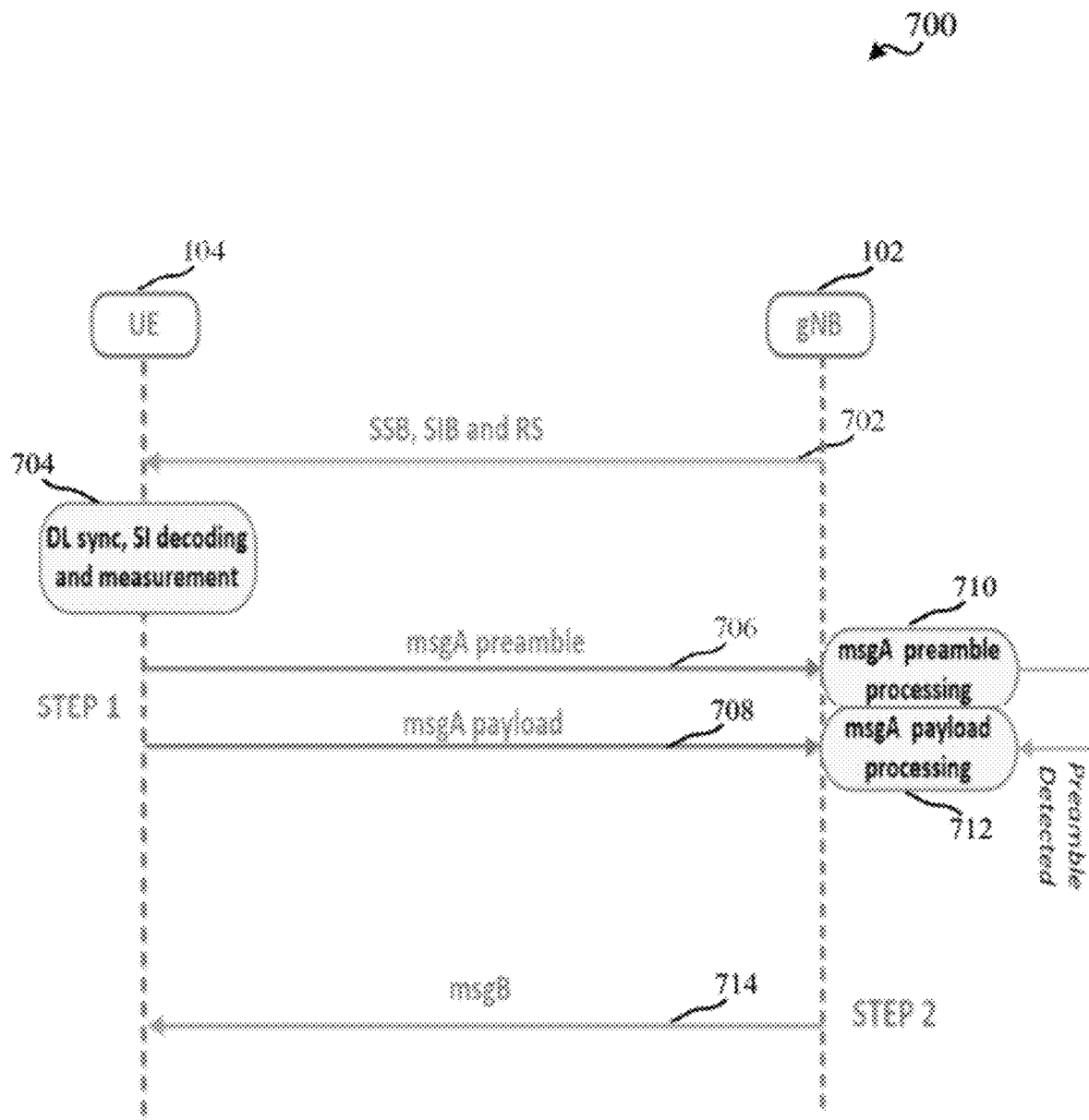
FIG. 7 illustrates an example of a system for transmitting random access messages, in accordance with various aspects of the present disclosure.

FIG. 7 illustrates an example of a system 700 for transmitting random access messages in a two-step random access procedure. Before starting two-step RACH, UE can receive and processes SSB/system information block (SIB)/reference signal (RS) from the serving gNB. In an example, a SIB may include information related to determining random access occasions, determining SSBs, etc. For example, system 700 includes a UE 104 that can transmit random access messages to a gNB 102 for requesting connection establishment therewith. In this example, gNB 102 can transmit SSB, SIB, and RS 702. The UE 104 can perform downlink synchronization, system information decoding and measurements at 704. Based on the data in UE's 104 buffer, a UE-identifier and the system information, the UE 104 can generate a message A (msgA), also referred to herein as the random access message, and transmit it to gNB on a RO associated with a suitable SSB beam. The UE 104 can transmit msgA as a preamble portion 706 and a payload portion 708. After possibly receiving and processing msgA preamble/payload, gNB 102 can generate response message (e.g., msgB), which can be formatted based on the RRC state and use case of msgA, and/or based on a detection status of the msgA (e.g., detection/processing of a preamble portion at 710 and/or a payload portion at 712), as described herein. gNB 102 can transmit the msgB to UE 104 at 714.

Figure 8:
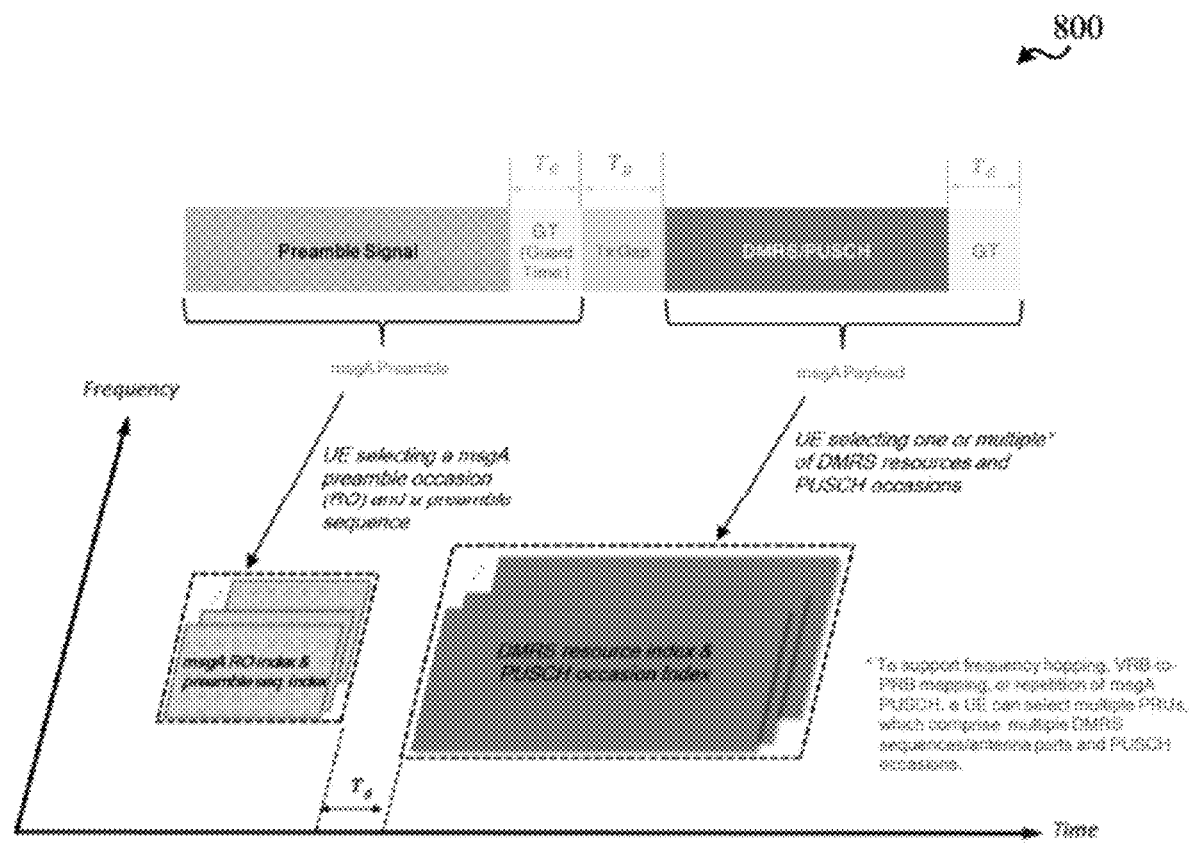
FIG. 8 illustrates an example of a resource allocation for configured random access preamble occasions and payload occasions, in accordance with various aspects of the present disclosure.

FIG. 8 illustrates an example of resource allocation 800 for preamble occasions and payload occasions. For example, based on the PRACH configuration index (e.g., msgA RO index), preamble occasions can be defined over frequency and time resources. In addition, the PRACH configuration index or other configurations may be used to indicate one or more preamble sequence indices to be used in each preamble occasion. The UE 104 can accordingly select a preamble occasion and can transmit the associated preamble sequence in the preamble occasion, as described further herein, and the UE 104 can also select one or more payload occasions for transmitting the payload portion of the random access message, which occurs at least a transmission gap (Tx Gap) after the preamble occasion. In one example, the UE 104 can select multiple payload occasions for transmitting the payload portion of the random access message. In one example, the payload occasions can be determined to occur after the transmission gap and can be distributed in frequency, as shown in resource allocation 800.

As described, however, not all of the configured preamble occasions/payload occasions may be suitable to meet reliability and latency requirements of a two-step RACH procedure. Accordingly, in an example, the preamble occasions and/or payload occasions can be associated specifically to one or more SSB beams (e.g., by the network or base station 102, as described above), and configuration analyzing component 252 can receive a configuration with an indication of the association to allow the UE 104 to determine, for a given SSB beam, associated preamble occasion(s) and/or payload occasion(s). In one example, the one or more configurations may include a configuration indicating a first number of one or more SSB beams (or a fraction of a SSB beam) associated with a random access occasion and/or a second number of random access preambles (e.g., contention based random access (CBRA) preamble sequences) per SSB beam per random access occasion, where the random access occasion may include a preamble occasion and/or one or more payload occasions.

In one example, random access occasions (also referred to as msgA occasions) can be defined as the time and frequency resources allocated for preamble and payload transmission of msgA within a configuration period $T_{msgA}$. In one example, configuration for msgA can include distributing msgA occasion mapping in time, as described. For example, within a SSB beam to msgA association period given by $T_{ssb-msgA}$, as described above, msgA occasions can be distributed in time, so that each msgA transmission can be associated with an appropriate set of SSB beam(s). In one example, configuration analyzing component 252 can receive and/or analyze a number $N_{2step}$ of SSB beams associated with one msgA occasion and a number $L_{2step}$ of CBRA preambles per SSB beam per msgA occasion, which can be provided in a configuration from the base station 102 (e.g., as one or more association patterns), as described.

In method 500, optionally at Block 504, a link quality associated with at least one SSB beam can be evaluated. In an aspect, occasion determining component 254, e.g., in conjunction with processor(s) 212, memory 216, transceiver 202, communicating component 242, etc., can evaluate the link quality associated with the at least one SSB beam. For example, occasion determining component 254 can evaluate the link quality of one or more SSB beams received from the base station 102 to determine whether the SSB beam is desirable for transmitting the random access message, which may include the preamble portion and/or the payload portion (e.g., using a reciprocal beam). In one example, occasion determining component 254 can determine whether the link quality achieves a threshold signal quality. In one example, the threshold signal quality can be received in a configuration from the base station 102, as described above. If the link quality achieves the threshold signal quality, for example, occasion determining component 254 can determine the SSB beam as desirable for transmitting the random access message.

In method 500, at Block 506, at least one preamble occasion and/or at least one payload occasion associated with the at least one SSB beam can be determined for at least one SSB beam. In an aspect, occasion determining component 254, e.g., in conjunction with processor(s) 212, memory 216, transceiver 202, communicating component 242, etc., can determine, for the at least one SSB beam, at least one preamble occasion and/or at least one payload occasion associated with the at least one SSB beam. For example, occasion determining component 254 can determine a set of preamble occasions and/or a set of payload occasions associated with at least one SSB beam. In an example, this may include determining a set of preamble occasions and/or a set of payload occasions associated with SSB beams based on the one or more configurations received from the base station (e.g., at Block 502). For example, occasion determining component 254 can determine the set of preamble occasions associated with the at least one SSB beam associated with a link quality or received signal quality that satisfies the threshold (and/or may determine the set of payload occasions associated with the preamble occasions and/or the at least one SSB beam).

In the example described above, if $N_{2step}<1$, occasion determining component 254 can determine one SSB beam mapped to $1/N_{2step}$ msgA occasions consecutive in time domain and $L_{2step}$ preambles with consecutive sequence indexes. If $N_{2step}>=1$, occasion determining component 254 can determine $N_{2step}$ SSB beams mapped to a msgA occasion and $L_{2step}$ preambles with consecutive sequence indexes split (e.g., evenly) between $N_{2step}$ beams (e.g., the n-th SSB beam mapped to preamble sequence subsets starting with $L_{2step}*n/N_{2step}$, n=0, 1, . . . , $N_{2step}-1$). In an example, occasion determining component 254 can determine the mapping for all SSB beams in this regard. In another example, occasion determining component 254 can determine the mapping in this regard for the at least one SSB beam determined to have a link quality that achieves the threshold signal quality. In addition, occasion determining component 254 can determine mapping of different preamble occasions or preamble sequence subsets to different payload (e.g., PUSCH) occasions, as described above and further herein. In any case, occasion determining component 254 can determine at least one preamble occasion and at least one payload occasion related to the at least one SSB, which the UE 104 can use for transmitting a random access preamble and/or corresponding payload (e.g., PUSCH), as described further herein. The selection of preamble occasion and/or payload occasion corresponding to the at least one SSB may be based on one or more other parameters or determinations.

Additionally, in an example, the one or more configurations received at Block 502 can specify payload occasions for supporting type A and/or type B PUSCH mapping, where type A and type B PUSCH can be as defined in NR Release 15. For example, the different types can correspond to PUSCHs having different DMRS types or parameters (e.g., type A PUSCH can have a DMRS location in fixed symbols, such as a third or fourth symbol of a slot, where type B PUSCH can have a DMRS location in other fixed symbols, such as a first symbol of the PUSCH allocation). In this example, the one or more configurations can specify or otherwise support (or indicate support for) slot and/or mini-slot transmission for the payload, normal cyclic prefix (CP) and/or extended CP, etc. In addition, for example, the configuration may specify different ratios of type A and type B msgA PUSCH occasions as a function of msgA preamble occasions and msgA configuration period. In any case, determining the preamble occasion and/or payload occasion at Block 506 may include determining occasions that correspond to type A or type B PUSCH transmissions, that are slot or mini-slot based, normal CP or extended CP, etc.

In yet another example, occasion determining component 254 can determine the at least one preamble occasion and/or at least one payload occasion associated with an SSB beam determined to have a link quality that achieves the threshold signal quality (e.g., as evaluated at Block 504), associated with a SSB beam determined to have the highest link quality (that also achieves the threshold signal quality), associated with a subset of SSB beams with a highest link quality, or some other criteria. In one example, in this regard, occasion determining component 254 may determine multiple possible preamble occasions and/or payload occasions that relate to one or more SSB beams, and may select at least one preamble occasion and/or payload occasion based on one or more criteria, as described above and further herein.

In method 500, optionally at Block 508, a time interval between the at least one preamble occasion and the at least one payload occasion can be measured and compared to a threshold transmission latency. In an aspect, occasion determining component 254, e.g., in conjunction with processor(s) 212, memory 216, transceiver 202, communicating component 242, etc., can measure the time interval between the at least one preamble occasion and the at least one payload occasion and compare the time interval to a threshold transmission latency. For example, occasion determining component 254 can perform the comparison to determine preamble occasions and payload occasions that can be used together to transmit the random access message while satisfying the latency requirements for two-step random access procedure. In this regard, occasion determining component 254 can compare the time interval for each of multiple preamble occasions and payload occasions determined to be associated with a desirable SSB beam, each of multiple preamble occasions and payload occasions determined to be associated with multiple desirable SSB beams, etc. (e.g., as described above in Block 506).

In method 500, optionally at Block 510, one or more pairs of the at least one preamble occasion and the at least one payload occasion that satisfy at least one of the threshold signal quality or the threshold transmission latency can be determined. In an aspect, occasion determining component 254, e.g., in conjunction with processor(s) 212, memory 216, transceiver 202, communicating component 242, etc., can determine the one or more pairs of the at least one preamble occasion and the at least one payload occasion that satisfy at least one of the threshold signal quality or the threshold transmission latency. As described, occasion determining component 254 can determine the one or more pairs of preamble occasion(s) and payload occasion(s) as a set of preamble occasion(s) and payload occasion(s) related to one or more desirable SSB beams and then can determine the pairs of preamble occasion and one or more payload occasion in the set that allow for achieving the threshold transmission latency.

For example, in this regard, occasion determining component 254 can determine a proximity-based multiplexing of preamble occasion and payload occasion(s). For example, msgA preamble occasions (also referred to as random access preamble occasions (RO)) can be partitioned into different groups based on their time occasions (e.g., a first RO group, second RO group, etc.). To achieve lower latency, a payload occasion (e.g., msgA PUSCH occasion) can be time division multiplexed with the closest (in time) msgA preamble occasion within the same configuration period. An example is shown in FIG. 9.

Figure 9:
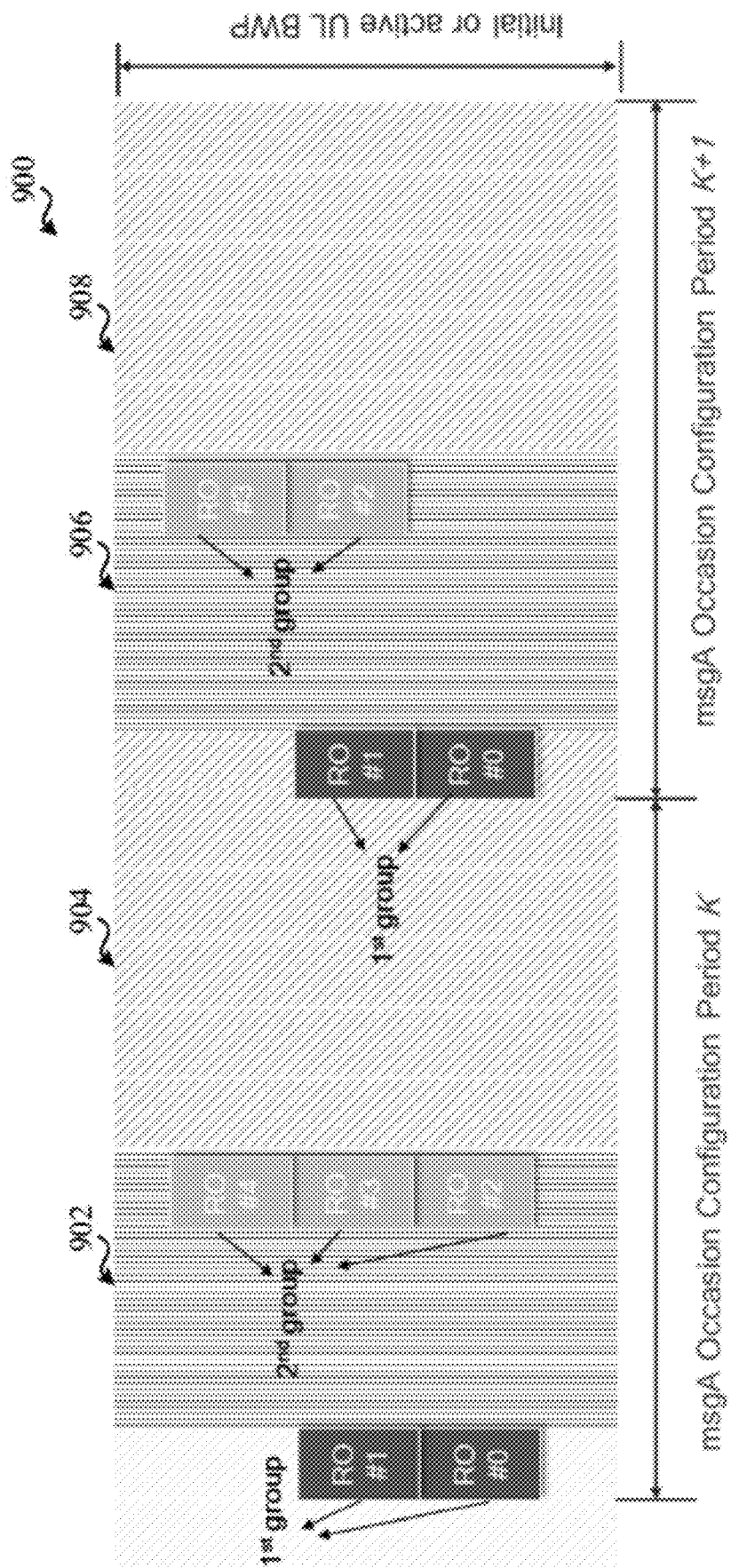
FIG. 9 illustrates an example of a random access occasion configuration, in accordance with various aspects of the present disclosure.

FIG. 9 illustrates an example of a random access occasion configuration 900. In this example, configuration period K has 5 msgA preamble occasions (RO #0 to #4), and configuration period (K+1) has 4 msgA preamble occasions (RO #0 to #3). Occasion determining component 254 can partition msgA preamble occasions within the same configuration period into different RO group according to time occasions. Within each msgA configuration period, msgA PUSCH occasions configured for n-th RO group can precede the msgA PUSCH occasions configured for (n+1)-th group, and msgA PUSCH occasions configured for n-th RO group can end no later than the (n+1)-th RO group. For example, PUSCH occasions for the n-th RO group in configuration period K can be in resources 902. In addition, for example, PUSCH occasions for the (n+1)-th RO group in configuration period K can be in resources 904. In addition, for example, PUSCH occasions for the n-th RO group in configuration period K+1 can be in resources 906. In addition, for example, PUSCH occasions for the (n+1)-th RO group in configuration period K+1 can be in resources 908. In an example, occasion determining component 254 can determine the payload occasion(s) for a given preamble occasion based on the RO group of the preamble occasion and the PUSCH resources that correspond to the RO group.

In method 500, at Block 512, the random access preamble can be transmitted on the at least one preamble occasion and/or a payload corresponding to the random access preamble can be transmitted on the at least one payload occasion. In an aspect, communicating component 242, e.g., in conjunction with processor(s) 212, memory 216, transceiver 202, etc., can transmit, on the at least one preamble occasion, the random access preamble and/or can transmit, on the at least one payload occasion, the payload corresponding to the random access preamble in a two-step random access procedure. In one example, preamble selecting component 256 can select the random access preamble to transmit based on the preamble occasion.

For example, preamble selecting component 256 can determine the preamble sequence associated, e.g., in the one or more configurations received at Block 502, with the preamble occasion, and communicating component 242 can transmit the preamble sequence over resources (e.g., time and frequency resources) of the preamble occasion. In one example, as described, preamble selecting component 256 can determine one or more random access preambles with consecutive sequence indices that are associated with the preamble occasion. For example, the SSB beam related to the preamble occasion can be mapped to $1/N_{2step}$ msgA occasions consecutive in time domain and $L_{2step}$ preambles with consecutive sequence indexes, or $N_{2step}$ SSB beams can be mapped to a msgA occasion and $L_{2step}$ preambles with consecutive sequence indexes split (e.g., evenly) between $N_{2step}$ beams, as described above. Thus, based on the determined preamble occasion and/or SSB beam, communicating component 242 can determine the preamble sequence to be transmitted.

Moreover, in an example, communicating component 242 can transmit the payload as a PUSCH and/or DMRS determined to be transmitted as part of the two-step random access procedure. In addition, this may include transmitting the preamble or payload in a slot or mini-slot for the payload occasion, using a normal CP or extended CP, as a type A or type B PUSCH, etc.

Figure 10:
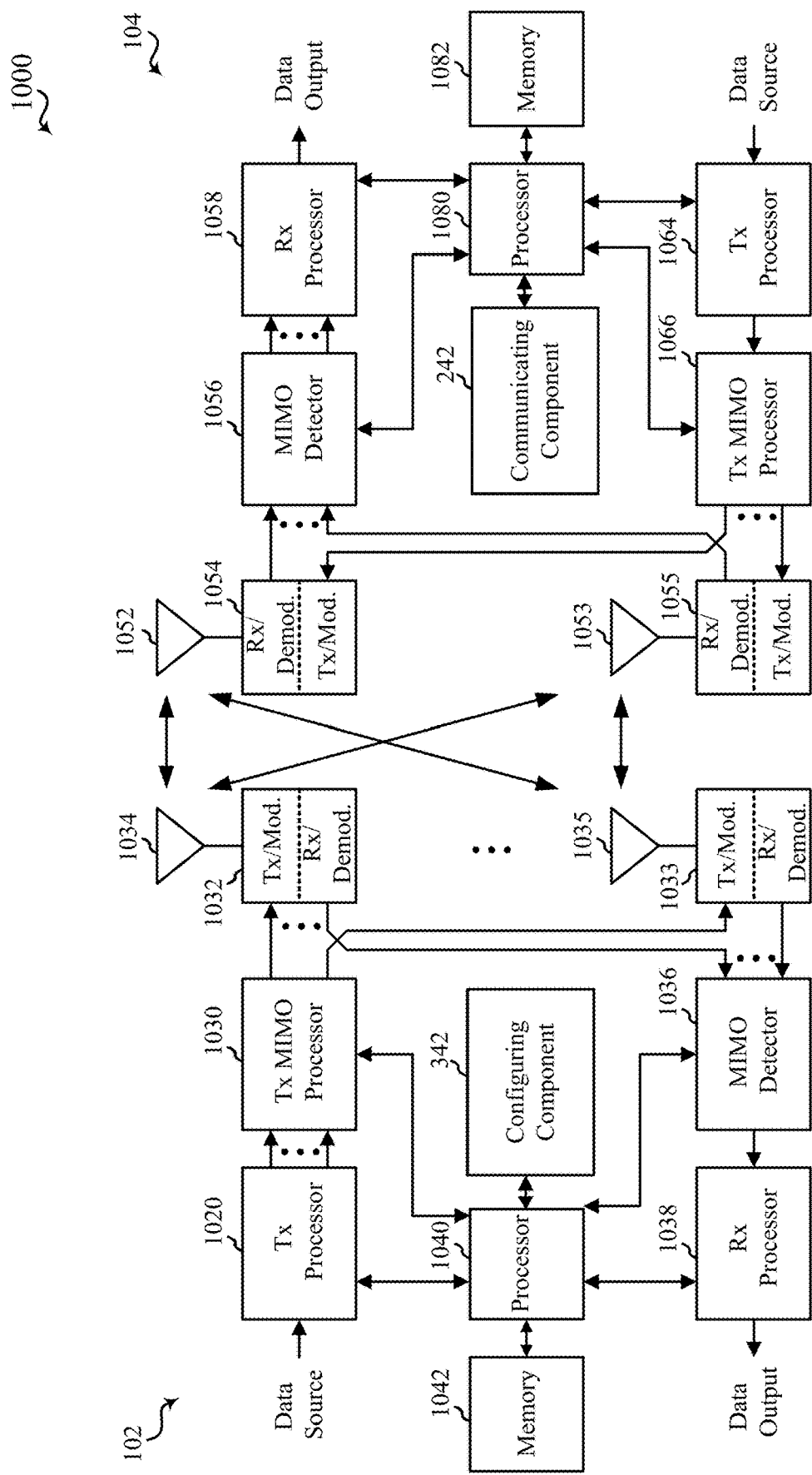
FIG. 10 is a block diagram illustrating an example of a MIMO communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.)

to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a communicating component 242 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1000.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples of the present invention is provided:

1. A method of wireless communication, comprising:

receiving, from a base station, one or more configurations indicating multiple preamble occasions and multiple payload occasions associated with each of one or more synchronization signal block (SSB) beams;

evaluating a link quality associated with at least one SSB beam of the one or more SSB beams by measuring the at least one SSB beam based on which to transmit a random access preamble;

determining, for the at least one SSB beam and based on determining that the link quality satisfies a threshold signal quality, at least one preamble occasion of the multiple preamble occasions and at least one payload occasion of the multiple payload occasions associated with the at least one SSB beam;

measuring a time interval between the at least one preamble occasion and the at least one payload occasion, and comparing the time interval to a threshold transmission latency;

determining one or more pairs of the at least one preamble occasion and the at least one payload occasion that satisfy the threshold signal quality and the threshold transmission latency;

transmitting, on the at least one preamble occasion, the random access preamble; and transmitting, on the at least one payload occasion, a payload corresponding to the random access preamble.

2. The method of example 1, wherein the one or more configurations indicate a first number of the one or more SSB beams and a second number of the multiple preamble occasions associated with at least the SSB beam per one or more random access preambles, and wherein determining the at least one preamble occasion comprises selecting the at least one preamble occasion and the random access preamble based at least in part on the first number and the second number.

3. The method of example 2, wherein selecting the at least one preamble occasion or the random access preamble is based at least in part on mapping the at least one SSB beam to a portion of the at least one preamble occasion and the one or more random access preambles with consecutive sequence indices.

4. The method of any of examples 1 or 2, wherein selecting the at least one preamble occasion or the random access preamble is based at least in part on mapping the at least one SSB beam to the at least one preamble occasion and the one or more random access preambles with consecutive sequence indices.

5. The method of any of examples 1 to 4, wherein the multiple preamble occasions or the multiple payload occasions are configured in a slot or a mini-slot.

6. The method of any of examples 1 to 5, wherein at least one of transmitting the random access preamble or transmitting the payload is based on a normal cyclic prefix or an extended cyclic prefix.

7. The method of any of examples 1 to 6, wherein determining the at least one payload occasion comprises determining the at least one payload occasion that is time division duplexed with a closest one of the at least one preamble occasion.

8. A method for wireless communication, comprising:

configuring a preamble configuration period for a preamble of a random access message;

configuring a payload configuration period for a payload of the random access message;

determining a random access occasion configuration period based at least in part on the preamble configuration period and the payload configuration period;

determining, based at least in part on the random access occasion configuration period, an association period for associating one or more random access occasions for transmitting the random access message based on one or more synchronization signal block (SSB) beams; and transmitting, to a user equipment (UE), one or more configurations indicating resources of the one or more random access occasions related to the one or more SSB beams within the association period.

9. The method of example 8, further comprising:

determining a first association pattern between at least one SSB beam of the one or more SSB beams and one or more preamble occasions associated with the preamble configuration period;

determining a second association pattern between at least one SSB beam of the one or more SSB beams and one or more payload occasions associated with the payload configuration period; and determining, based on the first association pattern and the second association pattern, the one or more random access occasions related to the one or more SSB beams, wherein the one or more configurations indicates at least one of the first association pattern, the second association pattern, or the association period.

10. The method of any of examples 8 or 9, wherein transmitting the one or more configurations to the UE comprises transmitting system information or radio resource control (RRC) signaling including the one or more configurations.

11. The method of any of examples 8 to 10, further comprising:

determining a threshold signal quality and a threshold transmission latency for selecting the one or more random access occasions; and indicating the threshold signal quality and the threshold transmission latency to the UE in system information or RRC.

12. The method of any of examples 8 to 11, wherein determining the random access occasion configuration period comprises determining a least common multiple of the preamble configuration period and the payload configuration period.

13. An apparatus for wireless communication, comprising:
a transceiver;
a memory configured to store instructions; and
one or more processors coupled with the transceiver and the memory, wherein the one or more processors are configured to execute the instructions to perform the operations of one or more methods in any of examples 1 to 12.

14. An apparatus for wireless communication, comprising means for performing the operations of one or more methods in any of examples 1 to 12.

15. A computer-readable medium, comprising code executable by one or more processors to perform the operations of one or more methods in any of examples 1 to 12.

What is claimed is:

1. A method of wireless communication, comprising:
receiving, from a base station, one or more configurations indicating multiple preamble occasions and multiple payload occasions associated with each of one or more synchronization signal block (SSB) beams;
determining, for at least one SSB beam of the one or more SSB beams and based on the one or more configurations, at least one preamble occasion of the multiple preamble occasions and at least one payload occasion of the multiple payload occasions associated with the at least one SSB beam;
transmitting, on the at least one preamble occasion, a random access preamble; and
transmitting, on the at least one payload occasion, a payload corresponding to the random access preamble.

2. The method of claim 1, further comprising evaluating a link quality associated with the one or more SSB beams by measuring the one or more SSB beams, wherein determining the at least one preamble occasion and the at least one payload occasion for the at least one SSB beam is based on determining the link quality of the at least one SSB beam as satisfying a threshold signal quality.

3. The method of claim 2, further comprising determining, based on the one or more configurations, one or more pairs of preamble occasions and payload occasions for the at least one SSB beam, wherein determining the at least one preamble occasion and the at least one payload occasion comprises selecting the at least one preamble occasion and the at least one payload occasion from the one or more pairs.

4. The method of claim 3, wherein selecting the one or more pairs is based at least in part on determining that a time interval between the at least one preamble occasion and the at least one payload occasion in one of the one or more pairs satisfies a threshold transmission latency.

5. The method of claim 1, wherein the one or more configurations indicate a first number of the one or more SSB beams and a second number of the multiple preamble occasions associated with each of the one or more SSB beams per one or more random access preambles, and wherein determining the at least one preamble occasion comprises selecting the at least one preamble occasion and the random access preamble based at least in part on the first number and the second number.

6. The method of claim 5, wherein selecting the at least one preamble occasion or the random access preamble is based at least in part on mapping the at least one SSB beam to a portion of the at least one preamble occasion and the one or more random access preambles with consecutive sequence indices.

7. The method of claim 5, wherein selecting the at least one preamble occasion or the random access preamble is based at least in part on mapping the at least one SSB beam to the at least one preamble occasion and the one or more random access preambles with consecutive sequence indices.

8. The method of claim 1, wherein the multiple preamble occasions or the multiple payload occasions are configured in a slot or a mini-slot.

9. The method of claim 1, wherein at least one of transmitting the random access preamble or transmitting the payload is based on a normal cyclic prefix or an extended cyclic prefix.

10. The method of claim 1, wherein determining the at least one payload occasion comprises determining the at least one payload occasion that is time division duplexed with a closest one of the at least one preamble occasion.

11. The method of claim 1, wherein the one or more configurations indicate a physical uplink shared channel (PUSCH) type associated with at least a portion of the multiple payload occasions.

12. A method for wireless communication, comprising:
configuring a preamble configuration period for a preamble of a random access message;
configuring a payload configuration period for a payload of the random access message;
determining a random access occasion configuration period based at least in part on the preamble configuration period and the payload configuration period;
determining, based at least in part on the random access occasion configuration period, an association period for associating one or more random access occasions for transmitting the random access message based on one or more synchronization signal block (SSB) beams; and
transmitting, to a user equipment (UE), one or more configurations indicating resources of the one or more random access occasions related to the one or more SSB beams within the association period.

13. The method of claim 12, further comprising transmitting, to the UE, an indication of a first number of the one or more SSB beams and a second number of multiple preamble occasions associated with each of the one or more SSB beams per one or more random access preambles.

14. The method of claim 12, further comprising:
determining a first association pattern between at least one SSB beam of the one or more SSB beams and one or more preamble occasions associated with the preamble configuration period;
determining a second association pattern between at least one SSB beam of the one or more SSB beams and one or more payload occasions associated with the payload configuration period; and
determining, based on the first association pattern and the second association pattern, the one or more random access occasions related to the one or more SSB beams, wherein the one or more configurations indicates at least one of the first association pattern, the second association pattern, or the association period.

15. The method of claim 12, wherein transmitting the one or more configurations to the UE comprises transmitting system information or radio resource control (RRC) signaling including the one or more configurations.

16. The method of claim 12, further comprising:
determining at least one of threshold signal quality or a threshold transmission latency for selecting the one or more random access occasions; and
indicating at least one of the threshold signal quality or the threshold transmission latency to the UE in system information or radio resource control (RRC) signaling.

17. The method of claim 12, wherein determining the random access occasion configuration period comprises determining a least common multiple of the preamble configuration period and the payload configuration period.

18. An apparatus for wireless communication, comprising:
a transceiver;
a memory; and
one or more processors coupled with the memory and the transceiver, wherein the memory stores instructions executable by the one or more processors to cause the apparatus to:
receive, from a base station, one or more configurations indicating multiple preamble occasions and multiple payload occasions associated with each of one or more synchronization signal block (SSB) beams;
determine, for at least one SSB beam of the one or more SSB beams and based on the one or more configurations, at least one preamble occasion of the multiple preamble occasions and at least one payload occasion of the multiple payload occasions associated with the at least one SSB beam;
transmit, on the at least one preamble occasion, a random access preamble; and
transmit, on the at least one payload occasion, a payload corresponding to the random access preamble.

19. The apparatus of claim 18, wherein the memory further stores instructions executable by the one or more processors to cause the apparatus to evaluate a link quality associated with the one or more SSB beams by measuring the one or more SSB beams, wherein the one or more processors are configured to determine the at least one preamble occasion and the at least one payload occasion for the at least one SSB beam based on determining the link quality of the at least one SSB beam as satisfying a threshold signal quality.

20. The apparatus of claim 19, wherein the memory further stores instructions executable by the one or more processors to cause the apparatus to determine, based on the one or more configurations, one or more pairs of preamble occasions and payload occasions for the at least one SSB beam, wherein the one or more processors are configured to determine the at least one preamble occasion and the at least one payload occasion at least in part by selecting the at least one preamble occasion and the at least one payload occasion from the one or more pairs.

21. The apparatus of claim 20, wherein the memory further stores instructions executable by the one or more processors to cause the apparatus to select the one or more pairs based at least in part on determining that a time interval between the at least one preamble occasion and the at least one payload occasion in one of the one or more pairs satisfies a threshold transmission latency.

22. The apparatus of claim 19, wherein the one or more configurations indicate a first number of the one or more SSB beams and a second number of the multiple preamble occasions associated with each of the one or more SSB beams per one or more random access preambles, and wherein the one or more processors are configured to determine the at least one preamble occasion at least in part by selecting the at least one preamble occasion and the random access preamble based at least in part on the first number and the second number.

23. The apparatus of claim 22, wherein the memory further stores instructions executable by the one or more processors to cause the apparatus to select the at least one preamble occasion or the random access preamble based at least in part on mapping the at least one SSB beam to a portion of the at least one preamble occasion and the one or more random access preambles with consecutive sequence indices.

24. The apparatus of claim 22, wherein the memory further stores instructions executable by the one or more processors to cause the apparatus to select the at least one preamble occasion or the random access preamble based at least in part on mapping the at least one SSB beam to the at least one preamble occasion and the one or more random access preambles with consecutive sequence indices.

25. The apparatus of claim 19, wherein the multiple preamble occasions or the multiple payload occasions are configured in a slot or a mini-slot.

26. The apparatus of claim 19, wherein the memory further stores instructions executable by the one or more processors to cause the apparatus to at least one of transmit the random access preamble or transmit the payload is based on a normal cyclic prefix or an extended cyclic prefix.

27. The apparatus of claim 19, wherein the memory further stores instructions executable by the one or more processors to cause the apparatus to determine the at least one payload occasion that is time division duplexed with a closest one of the at least one preamble occasion.

28. The apparatus of claim 19, wherein the one or more configurations indicate a physical uplink shared channel (PUSCH) type associated with at least a portion of the multiple payload occasions.

29. An apparatus for wireless communication, comprising:
a transceiver;
a memory; and
one or more processors coupled with the memory and the transceiver, wherein the memory stores instructions executable by the one or more processors to cause the apparatus to:
configure a preamble configuration period for a preamble of a random access message;
configure a payload configuration period for a payload of the random access message;
determine a random access occasion configuration period based at least in part on the preamble configuration period and the payload configuration period;
determine, based at least in part on the random access occasion configuration period, an association period for associating one or more random access occasions for transmitting the random access message based on one or more synchronization signal block (SSB) beams; and
transmit, to a user equipment (UE), one or more configurations indicating resources of the one or more random access occasions related to the one or more SSB beams within the association period.

30. The apparatus of claim 29, wherein the memory further stores instructions executable by the one or more processors to cause the apparatus to transmit, to the UE, an indication of a first number of the one or more SSB beams and a second number of multiple preamble occasions associated with each of the one or more SSB beams per one or more random access preambles.

* * * * *